(12) United States Patent
Sato et al.

(10) Patent No.: US 6,404,487 B1
(45) Date of Patent: Jun. 11, 2002

(54) LIGHT MEASURING DEVICE

(75) Inventors: Yoichi Sato, Yokosuka; Taku Ezaki, Machida, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/395,362

(22) Filed: Sep. 14, 1999

(30) Foreign Application Priority Data

Sep. 16, 1998 (JP) .......................................... 10-261872

(51) Int. Cl.[7] .................................................. G01J 1/42
(52) U.S. Cl. ...................................................... 356/215
(58) Field of Search ................................ 356/215, 218; 250/338.4

(56) References Cited

U.S. PATENT DOCUMENTS

| | | | |
|---|---|---|---|
| 4,751,539 A | 6/1988 | Yamada et al. | 354/222 |
| 4,770,508 A | 9/1988 | Yamada et al. | 350/422 |
| 4,830,474 A | 5/1989 | Nakayama et al. | 350/422 |
| 4,871,238 A | 10/1989 | Sato et al. | 350/422 |
| 4,994,845 A * | 2/1991 | Naruse et al. | 354/415 |
| 5,747,805 A * | 5/1998 | Youngquist | 250/338.4 |

* cited by examiner

*Primary Examiner*—Frank G. Font
*Assistant Examiner*—Michael P. Stefira
(74) *Attorney, Agent, or Firm*—Fitzpatrick, Cella, Harper & Scinto (57) ABSTRACT

A light measurement device that selectively operates in a normal light measurement mode, in which the output from a sensor cell is logarithmically compressed and directly output as an output, or an integration light measurement mode, in which a signal obtained by integrating the output with an integrating circuit is output. In the integration light measurement mode, since the integrated output can be slowly read out after strobo light emission, accurate light measurement can be performed within a predetermined light measurement time even when the number of divisions of the sensor is increased.

12 Claims, 13 Drawing Sheets

| S10 | S11 | S12 | S13 | S14 |
|-----|-----|-----|-----|-----|
| S5  | S6  | S7  | S8  | S9  |
| S0  | S1  | S2  | S3  | S4  |

FIG. 6

|     | CSAE0 | CSAE1 | CSAE2 | CSAE3 |
|-----|-------|-------|-------|-------|
| S0  | 0 | 0 | 0 | 0 |
| S1  | 0 | 0 | 0 | 1 |
| S2  | 0 | 0 | 1 | 0 |
| S3  | 0 | 0 | 1 | 1 |
| S4  | 0 | 1 | 0 | 0 |
| S5  | 0 | 1 | 0 | 1 |
| S6  | 0 | 1 | 1 | 0 |
| S7  | 0 | 1 | 1 | 1 |
| S8  | 1 | 0 | 0 | 0 |
| S9  | 1 | 0 | 0 | 1 |
| S10 | 1 | 0 | 1 | 0 |
| S11 | 1 | 0 | 1 | 1 |
| S12 | 1 | 1 | 0 | 0 |
| S13 | 1 | 1 | 0 | 1 |
| S14 | 1 | 1 | 1 | 0 |
| CRS | 1 | 1 | 1 | 1 |

| FIG. 14A | FIG. 14B |

LIGHT MEASURING DEVICE

BACKGROUND OF THE INVENTION

1. Field of the Invention

The present invention relates to a light measuring device used in a camera or the like, and a computer-readable storage medium used in this device.

2. Related Background Art

Figure 1:
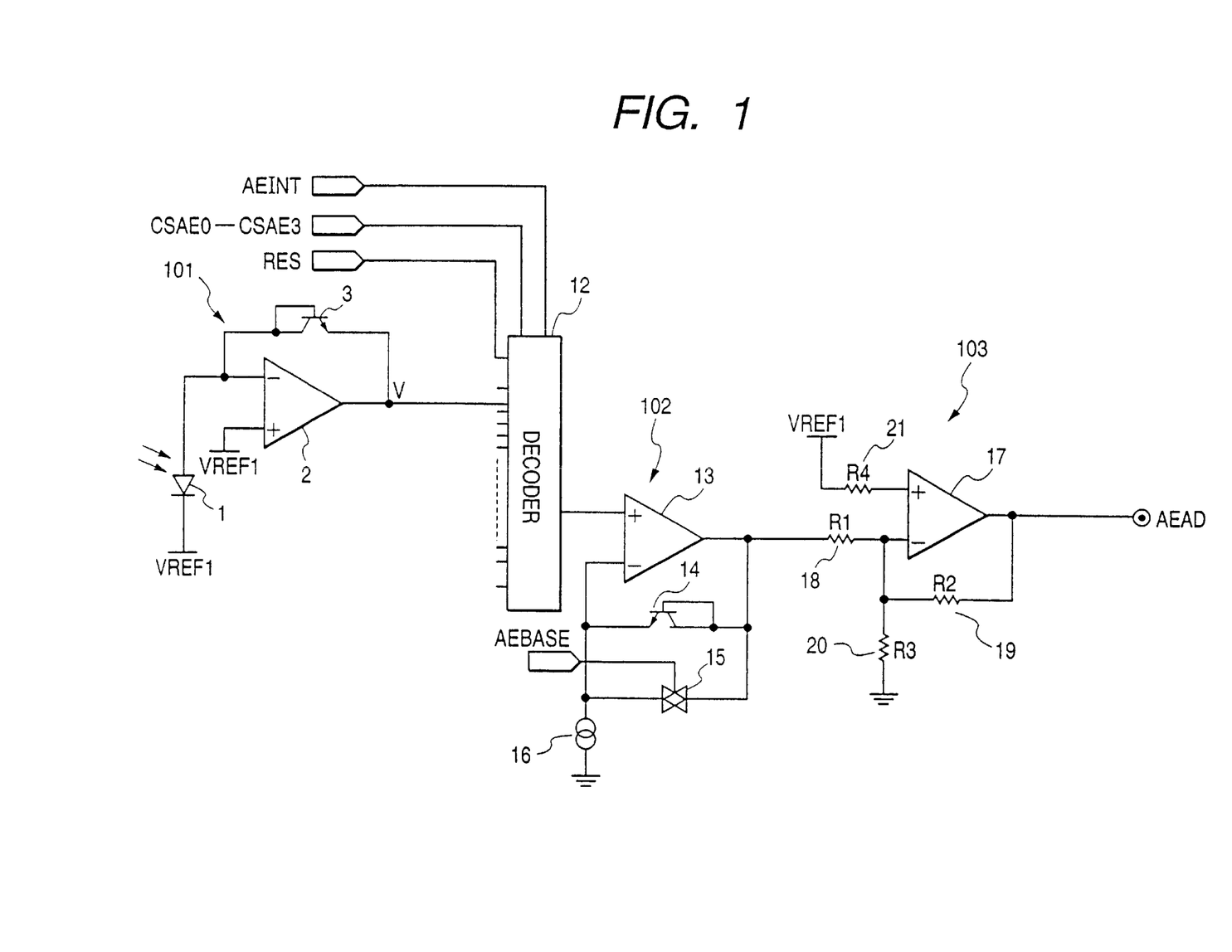
FIG. 1 is a view showing a conventional light measuring device.

FIG. 1 is a view showing a conventional light measuring device.

Figure 2:
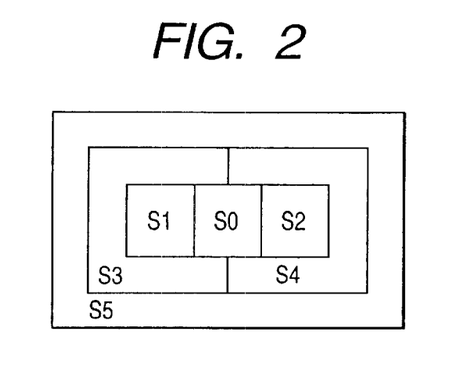
FIG. 2 is a view showing the divided surface of a conventional sensor.

Referring to FIG. 1, the cathode side of a sensor cell (to be simply referred to as a sensor hereinafter) 1 formed from a photodiode is biased by a predetermined voltage VREF1. The anode side is connected to the inverting terminal of an operational amplifier 2. This operational amplifier 2 and a logarithmic compression diode 3 formed from a transistor diode-connected to the operational amplifier 2 through diode conjunction construct a logarithmic compression circuit 101. The sensor portion of this light measuring device is divided into six sensors S0 to S5, as shown in FIG. 2.

The outputs from these sensors are input to a decoder 12 and switched by control signals AEINT, CSAE0 to CSAE3, and RES. One of the outputs is input to an operational amplifier 13. This operational amplifier 13, a diode 14, a switch 15, and a current source 16 form a dark current compensation circuit 102. The output from this dark current compensation circuit 102 is input to an amplifier 103 constructed by an operational amplifier 17 and resistors 18 to 21 to invert and amplify the signal.

Let Ip be the photocurrent flowing to the sensor 1, and Is be the reverse-direction saturation current of the logarithmic compression diode 3. An output V of the sensor 1 is given by $$V = kT/q\{ln(Ip/Is)\} \quad (1)$$

where k is the Boltzmann's constant, q is electric charge of the electron, and T is the absolute temperature.

The output V is selected by the decoder 12, output from the dark current compensation circuit 102, and inverted and amplified by the amplifier 103, so a light measurement output AEAD is obtained. Let R1 to R4 be the resistance values of the resistors 18 to 21, $$AEAD = -(R2/R1)*(V - VREF1) + (R2/R3)*VREF1 \quad (2)$$

Figure 3:
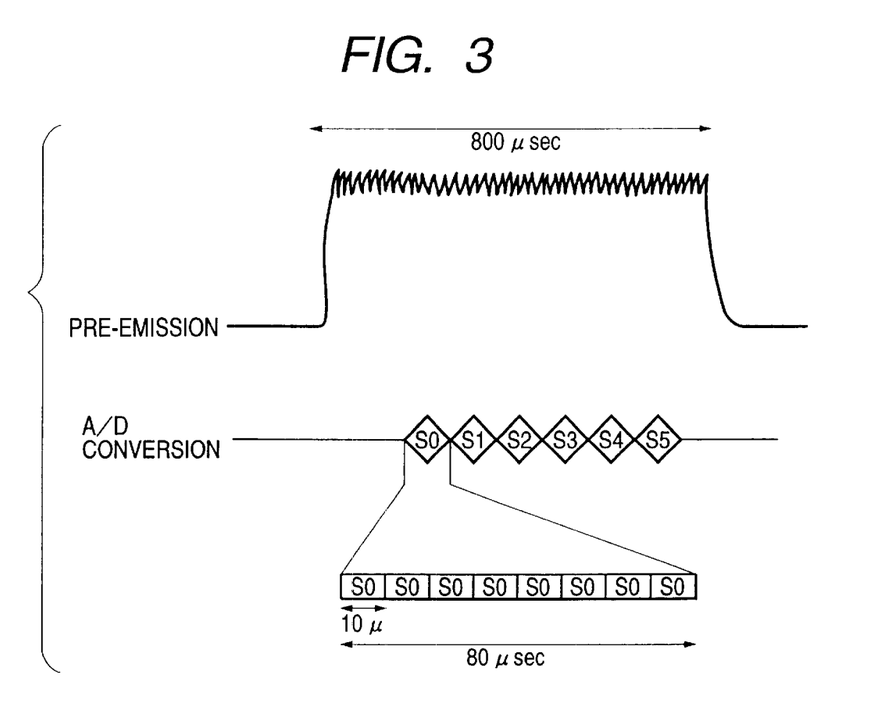
FIG. 3 is a timing chart showing the operation of the conventional light measuring device.

FIG. 3 shows the waveform of pre-emission and the timing of A/D conversion of the light measurement output in a light modulation method of pre-emitting strobo light (flashlight) before photographing by the camera and determining the light emission amount of actual light emission on the basis of the light measurement value at that time.

The light emission time of pre-emission is preferably short because actual light emission must be subsequently performed. Because, when a large energy is consumed in pre-emission, the light emission amount of the actual light emission becomes small. It is difficult to emit strobo light (flashlight) in a predetermined amount for a long time. For this reason, the pre-emission time is suppressed to about 800 $\mu$sec.

The light measurement output is A/D-converted and then input to the CPU. To increase the accuracy, the number of times of light measurement must be increased. Conventionally, the sensors S0 to S5 sequentially perform light measurement, and the light measurement outputs are A/D-converted. The time of A/D conversion of one cycle is 10 $\mu$sec. A/D conversion is performed eight times for each sensor, i.e., in 80 $\mu$sec. For this reason, a high-performance CPU or A/D converter is used.

However, in a system for pre-emitting flashlight before photographing and calculating the light emission amount of actual light emission on the basis of the light measurement value of pre-emission and a light measurement value immediately before pre-emission, the light emission time of pre-emission is limited because actual emission follows pre-emission. When the performance of the conventional A/D converter is taken into consideration, the A/D conversion time per sensor is as long as 10 $\mu$sec, as described above. To reduce errors due to, e.g., flicker of a fluorescent lamp, A/D conversion must be performed about eight times for one sensor, and the A/D conversion time becomes as long as 80 $\mu$sec.

The sensor switching time or the time after generation of a light emission instruction from the camera until actual light emission need also be taken into consideration. The number of divisions of the sensor may be increased, though the number of sensors is limited to six in the above scheme, as described above.

SUMMARY OF THE INVENTION

It is an object of the present invention to obtain an accurate light measurement value in a predetermined light measurement time even when the number of divisions of a sensor is large.

It is another object of the present invention to obtain an accurate light measurement value in a predetermined light measurement time and cope with low luminance to high luminance when the number of divisions of a sensor is large.

In order to achieve the above object, according to an aspect of the present invention, there is provided a light measuring device comprising sensor means for converting input light into an electrical signal, integrating means for integrating the electrical signal output from the sensor means, and control means for selectively setting one of a first mode in which the electrical signal is directly output and a second mode in which a signal obtained by integrating the electrical signal with the integrating means is output.

According, to another aspect of the present invention, there is provided a light measuring device comprising a plurality of sensor means for converting input light into electrical signals, a plurality of integrating means for compressing electrical signals from the plurality of sensors means in parallel to a predetermined level and integrating the compressed electrical signals, and control means for selectively settings one of a first mode, in which the electrical signals from the plurality of sensor means are output without being passed through the plurality of integrating means, and a second mode, in which the electrical signals from the plurality of sensor means are output through the plurality of integrating means.

According to still another aspect, there is provided a computer-readable storage medium which stores a program for executing conversion processing of converting input light into an electrical signal with sensor means, integrating processing of integrating the electrical signal output from the sensor means, first mode processing of directly outputting the electrical signal, second mode processing of outputting a signal obtained by integrating the electrical signal by integrating processing, and control processing of selectively setting one of the first and second modes.

DESCRIPTION OF THE PREFERRED EMBODIMENTS

The embodiments of the present invention will be described below with reference to the accompanying drawings.

Figure 4:
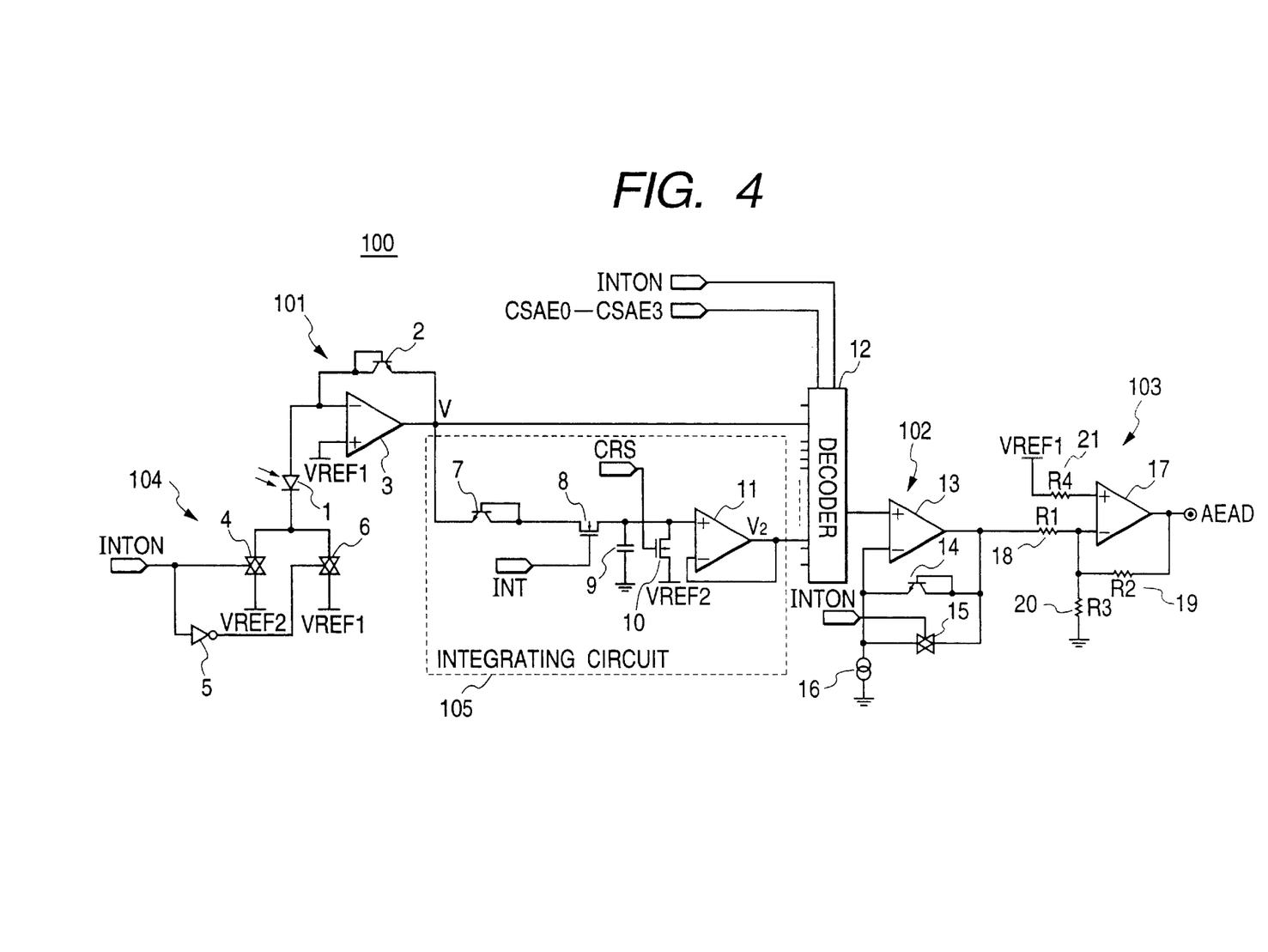
FIG. 4 is a view showing the first embodiment of the present invention.

FIG. 4 is a view showing the first embodiment of the present invention. The same reference numerals as in FIG. 1 denote the same parts in FIG. 4, and a detailed description thereof will be omitted.

Referring to FIG. 4, a light measuring device 100 of the present invention is different from that shown in FIG. 1 in that a sensor 1 has a bias change circuit 104, and an integrating circuit 105 for integrating a sensor output V is included. During integration by the integrating circuit 105, a dark current compensation circuit 102 stops its function in accordance with a control signal INTON and operates as a buffer. The output signals from sensors are input to a decoder 12 via the integrating circuit 105 or input to the decoder 12 without passing through the integrating circuit 105, so a normal light measurement mode and an integration light measurement mode can be selectively used.

Figure 5:
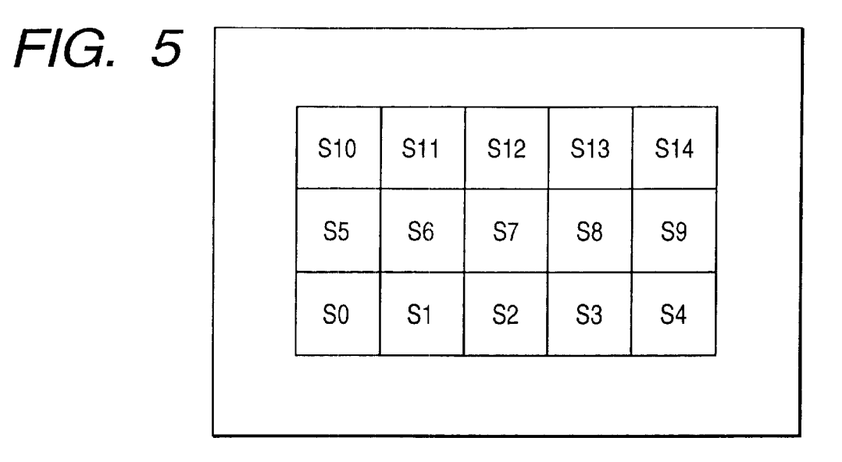
FIG. 5 is a view showing the divided surface of a sensor portion.

In this embodiment, the sensor portion is divided into 15 sensors S0 to S14, as shown in FIG. 5. The outer frame in FIG. 5 corresponds to the viewfinder field of a camera.

The bias change circuit 104 is formed from switches 4 and 6 and an inverter 5. The bias voltage is switched between VREF1 and VREF2 by switching the switches 4 and 6 in accordance with the integration mode start control signal INTON. In the normal light measurement mode, the voltage VREF1 is selected. In the integration light measurement mode, the voltage VREF2 is selected.

The integrating circuit 105 is constructed by a logarithmic compression diode 7, switches 8 and 10 formed from transistors, an integrating capacitor 9, and a buffer amplifier 11 against noise. Integration is started by a control signal INT. The capacitor 10 is reset by a control signal CRS.

The decoder 12 is controlled by the control signal INTON and also selects one sensor in accordance with control signals CSAE0 to CSAE3.

Figure 6:
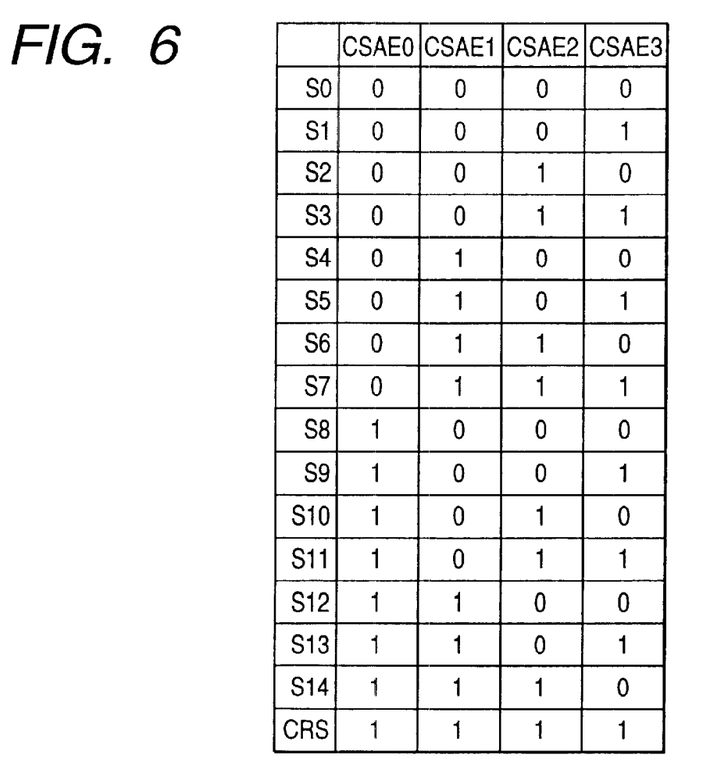
FIG. 6 is a view showing decoding examples of control signals.

FIG. 6 shows decoding examples of the control signals CSAE0 to CSAE3 with which the decoder 12 selects one of the sensors S0 to S14.

Figure 7:
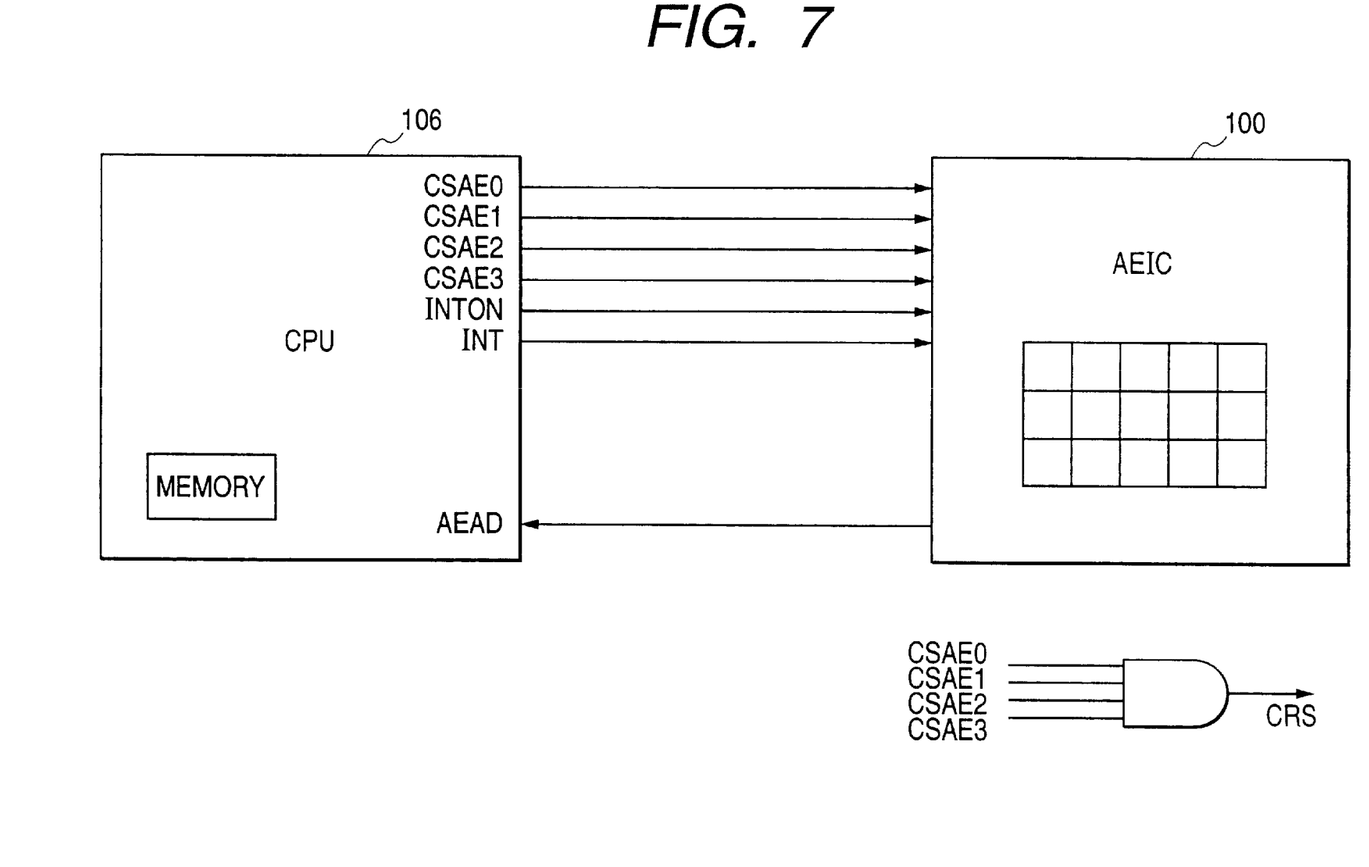
FIG. 7 is a block diagram showing connection between a CPU and a light measuring device.

FIG. 7 shows connection between the light measuring device 100 and a CPU 106. The control signals CSAE0 to CSAE3, INTON, and INT are sent from the CPU 106 to the light measuring device 100. A light measurement output AEAD is sent from the light measuring device 100 to the A/D conversion port of the CPU 106. As shown in FIG. 6, when all the control signals CSAE0 to CSAE3 are active, the control signal CRS is obtained.

The operation will be described next.

In the normal light measurement mode, the output V from a logarithmic compression circuit 101 is given by equation (1), and the light measurement output AEAD is given by equation (2).

In the integration light measurement mode, the switches 4 and 6 of the bias change circuit 104 are switched by the control signal INTON to change the bias voltage to VREF2. The bias voltage is changed to increase the response speed of the sensor to light. Next, the switch 10 is turned on by the control signal CRS to reset the capacitor 9 to VREF2. After the switch 10 is turned off, the switch 8 is turned on by the control signal INT. The potential of the capacitor 9 temporarily drops due to the logarithmic compression output V. Then, logarithmic compression integration is performed by the diode 7, and the potential of the capacitor increases. Logarithmic compression integration is performed by the diode 7 due to the following reason. In the normal light measurement mode, light measurement is divisionally performed eight times in 80 $\mu$sec. In the integration light measurement mode, however, light measurement is performed in 80 $\mu$sec without being divided into eight times, and a wider dynamic range is required.

After a predetermined time, the switch 8 is turned off to end integration. The capacitor 9 has a predetermined potential. The potential of the capacitor 9 is held constant unless the switch 8 or 10 is turned on, and therefore, can be slowly read out after completion of emission of strobo light. Hence, for light measurement by pre-emission in the normal light measurement mode, light measurement must be performed 112 times (when light measurement is performed eight times for each of the sixteen sensors) within the pre-emission range (800 $\mu$sec) shown in FIG. 3. However, the integration light measurement mode does not require this, and even a low-performance CPU can process the signals.

Figure 8:
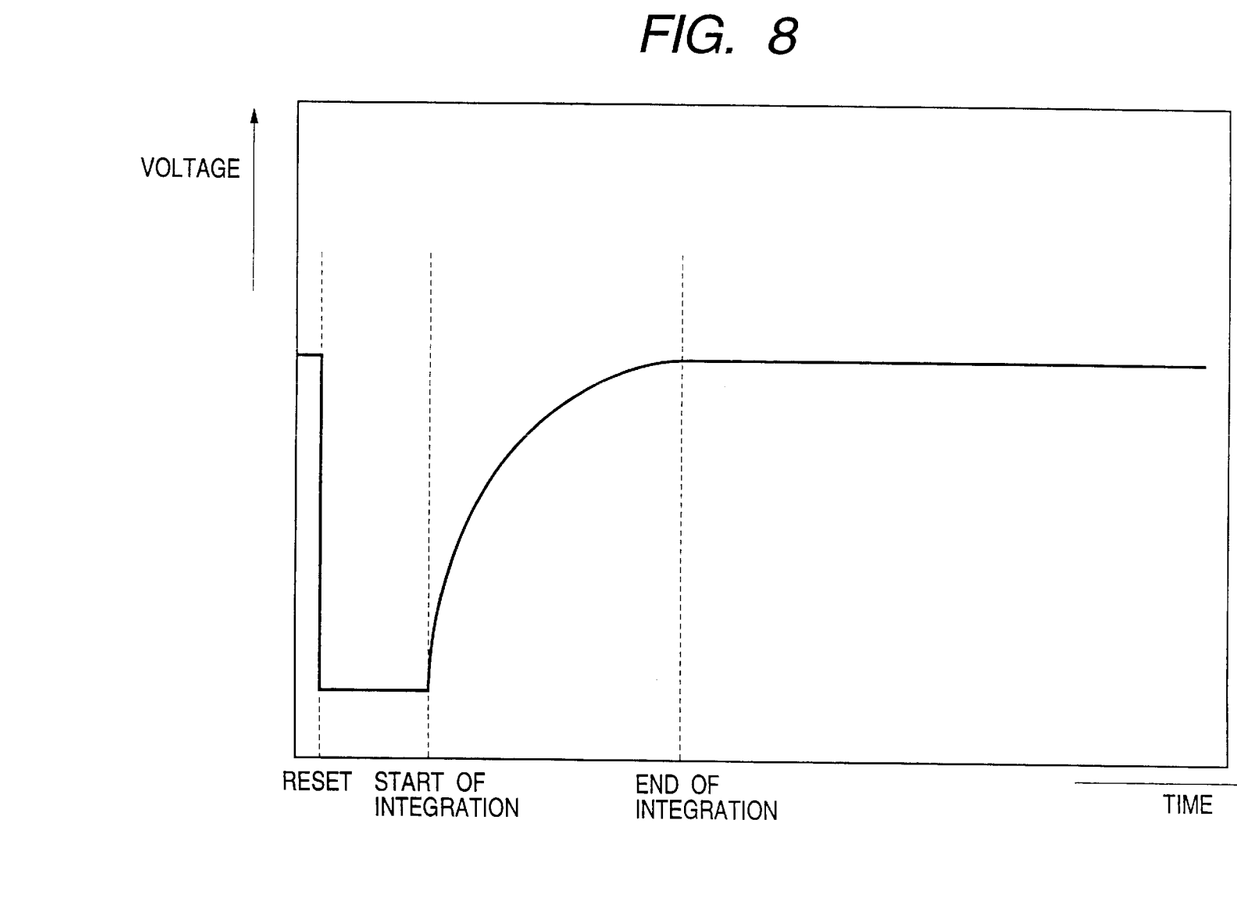
FIG. 8 is a graph showing the relationship between the integration time and the output voltage.

FIG. 8 shows the output voltage in the integration light measurement mode. In the reset state, the output voltage is 0 V. When integration starts, the capacitor 9 is charged. When integration is ended, the output voltage becomes constant.

When light measurement in the integration light measurement mode is ended, the switches 4 and 6 are switched to select the bias voltage VREF1 again.

Let t be the integration time, and Q be the integration value. An output voltage V2 is represented by $$Q = \int_o^t Ipdt \quad (3)$$

At this time, let C be the capacitance of the capacitor 9. The voltage of the capacitor 9 is represented by $$V2 = VREF1 - (kT/q)ln(qQ/kTC + exp\{q(VREF1 - VREF2)/kT\}) \quad (4)$$

An amplifier 103 has the same arrangement as that of the prior art. Hence, the final output AEAD is given by $$AEAD=-(R2/R1)*(V2-VREF1)+(R2/R3)*VREF1=-(R2/R1)*(kT/q)ln(qQ/kTC+exp\{q(VREF1-VREF2)/kT\})+(R2/R3)*VREF1 \quad (5)$$

Figure 9:
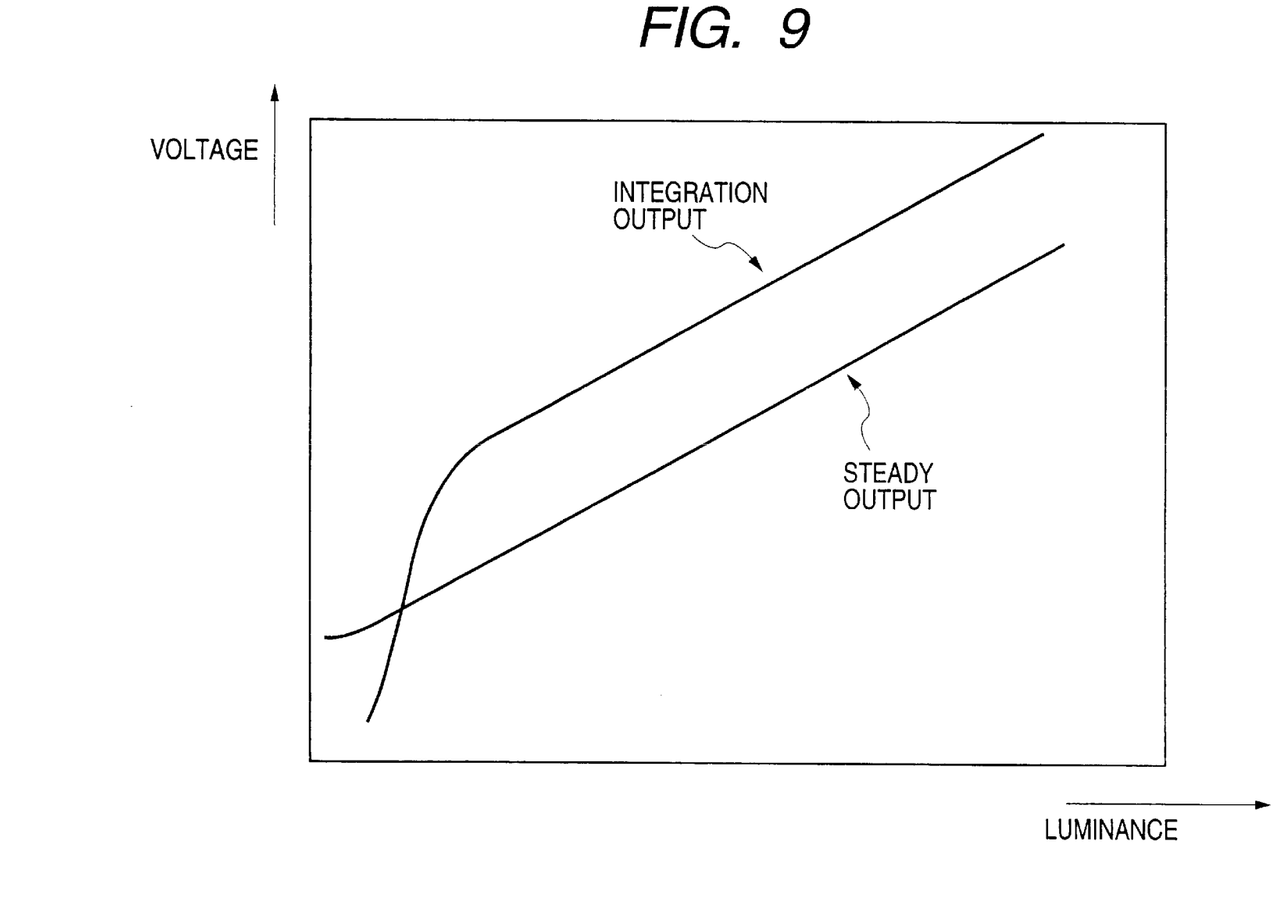
FIG. 9 is a graph showing the relationships between the luminance and the output voltage in a normal light measurement mode and an integration light measurement mode.

FIG. 9 is a graph showing output voltages with respect to the luminance of the sensor.

As shown in equation (4), the integration light measurement mode has the term $\exp\{q(VREF1-VREF2)kt\}$. Since this term cannot be neglected at low luminance, the linearity at low luminance degrades, as shown in FIG. 9.

In the integration light measurement mode, the bias voltage of the sensor 1 is changed. However, when the response speed of the sensor to light is increased, the linearity at low luminance degrades.

Since the two modes use different sensor biases even for the same luminance, different output voltages are obtained. For this reason, correction data for correcting the light measurement output are stored in the memory of the CPU 106 in units of modes.

For natural light, the range of low luminance to high luminance must be taken into consideration. However, unlike strobo light, the light emission time is not limited, and high-speed A/D conversion need not be performed.

For strobo light, the strobo light emission time is limited, though light measurement at low luminance is not to be performed.

In consideration of these points, in the first embodiment, when light measurement is to be performed using not strobo light emission but only natural light, the normal light measurement mode is used. For light measurement using strobo light emission, the integration light measurement mode is used. Even when the number of divisions of the sensor is large, accurate light measurement is possible in the range of low luminance to high luminance.

The second embodiment will be described next with reference to FIG. 10.

As described above with reference to FIG. 9, in the first embodiment, since the sensor bias is changed in accordance with the light measurement mode, the light measurement output is corrected using data stored in the memory of the CPU 106 in units of modes. This complicates light measurement calculation.

The second embodiment solves this problem. As shown in FIG. 10, an amplifier 103 has a compensation circuit 107.

The compensation circuit 107 is constructed by a resistor 23 having a resistance value R5 and a switch 22 controlled by a control signal INTON and connected to a voltage VREF2.

In the above arrangement, when a current is injected to the input of the amplifier 103 before a final output AEAD in the integration light measurement mode, the same output as in the normal light measurement mode is obtained.

More specifically, when the resistor 23 biased by the voltage VREF2 is connected to the input of the amplifier 103, the same final output AEAD as in the normal light measurement mode can be obtained as $$AEAD=-(R2/R1)*(V2-VREF1)+(R2/R3)*VREF1+(R2/R5)*(VREF1-VREF2) \quad (6)$$

In this embodiment as well as the first embodiment, light measurement using natural light and light measurement using strobo light can be selectively used.

The third embodiment will be described next with reference to FIG. 11.

The second embodiment is effective as long as the integration time is constant. However, when the integration time is changed, the same output cannot be obtained. The third embodiment is presented to solve this problem and uses a correction circuit 108 as shown in FIG. 11.

The correction circuit 108 is formed from resistors 23, 25, 27, and 29, and switches 22, 24, 26, and 28 connected to a voltage VREF2. By controlling the switches by control signals INT1 to INT4 in accordance with the integration time, 16 corrected outputs can be obtained.

Figure 12:
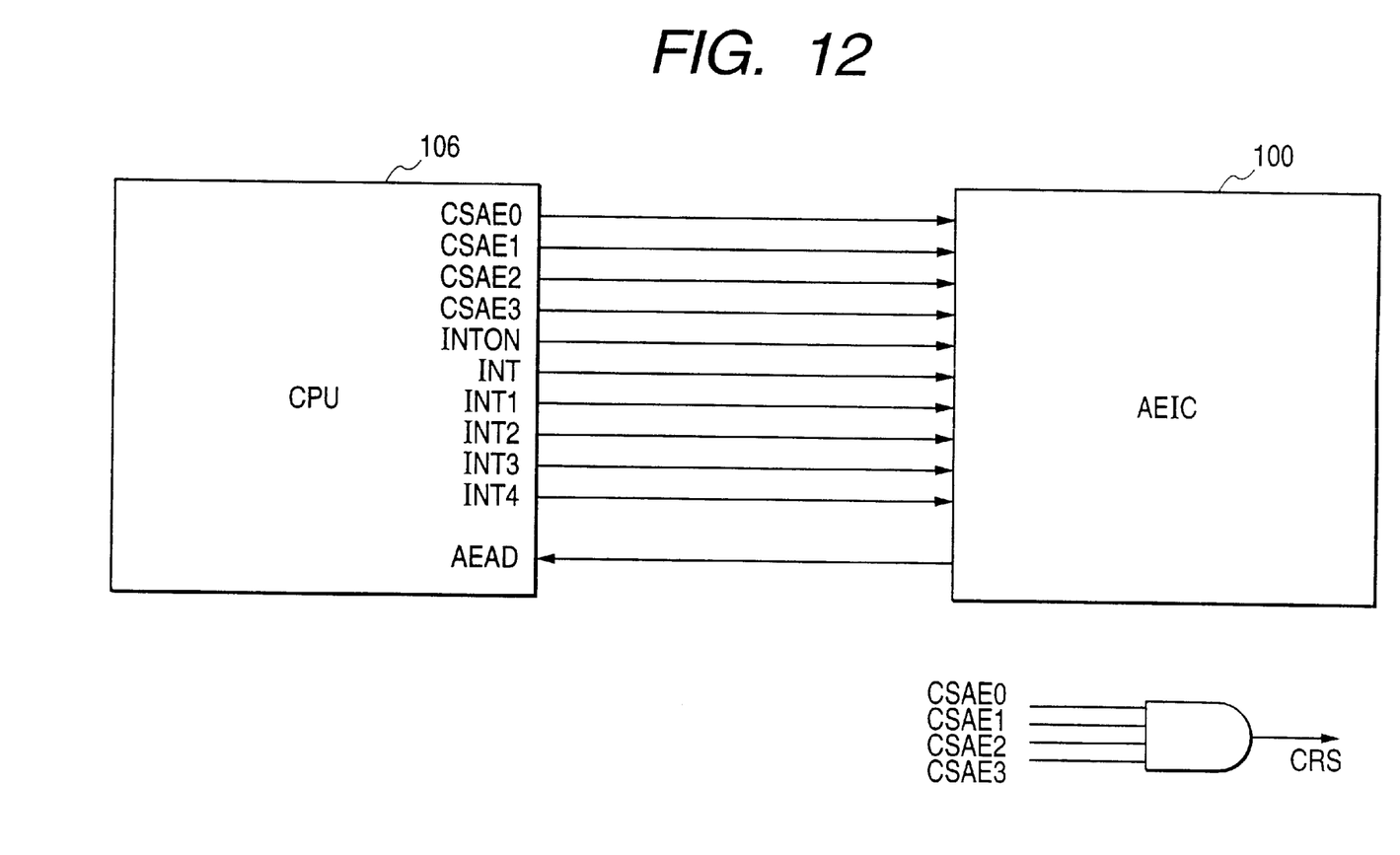
FIG. 12 is a block diagram showing connection between a CPU and a light measuring device according to the third embodiment.

FIG. 12 shows connection between a CPU 106 and a light measuring device 100. The control signals INT1 to INT4 are sent from the CPU 106 to the light measuring device 100.

Figure 13:
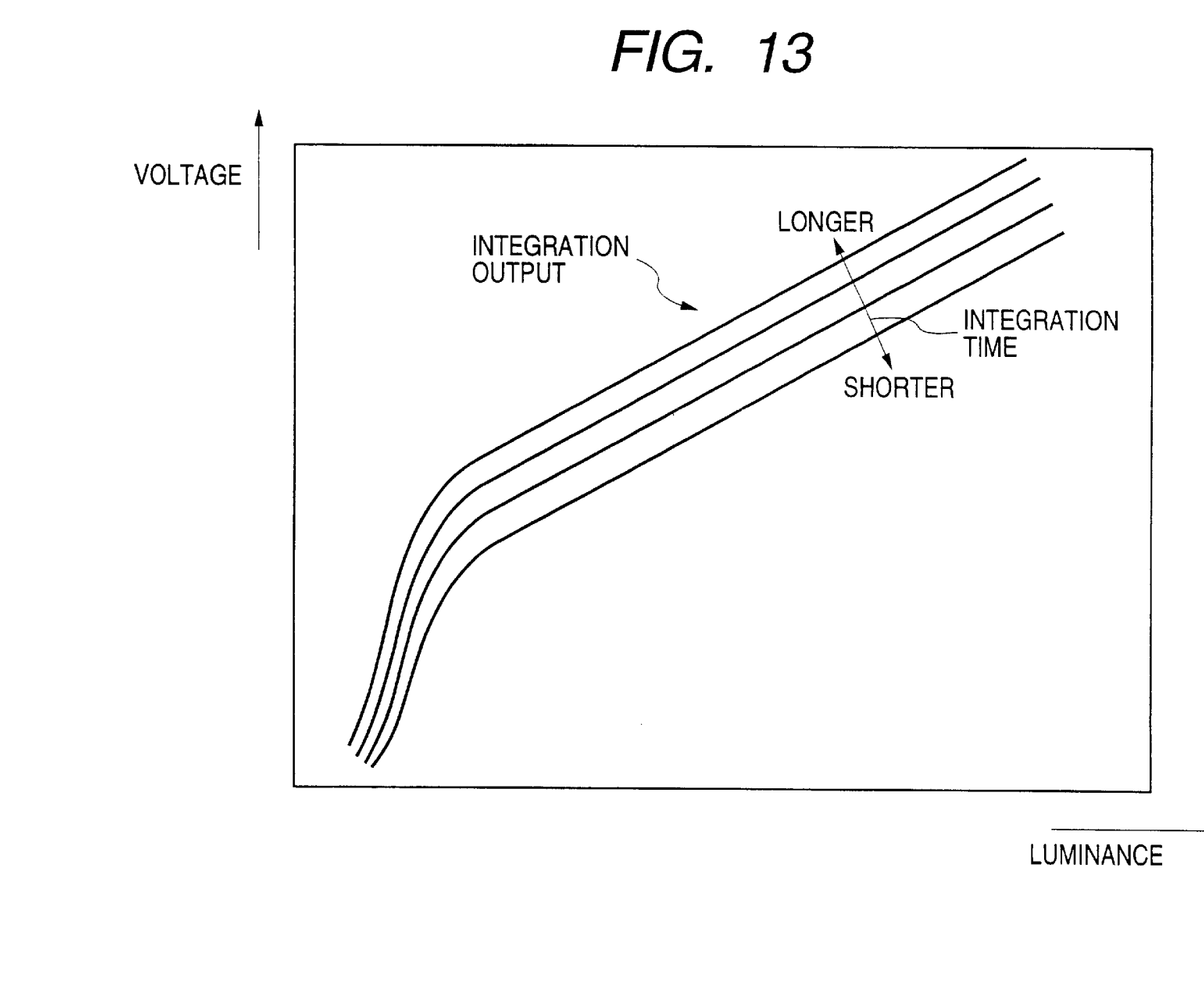
FIG. 13 is a graph showing correction of the output voltage in the third embodiment.

According to this arrangement, a predetermined light measurement output can be obtained even when the integration time is changed, as shown in FIG. 13. In this embodiment as well as the first and second embodiments, light measurement using natural light and light measurement using strobo light can be selectively used, as in the first and second embodiments.

Figure 14:
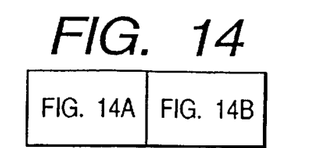
FIG. 14, composed of FIGS. 14A and 14B, is a view showing a camera system according to the fourth embodiment.
Figure 14A:
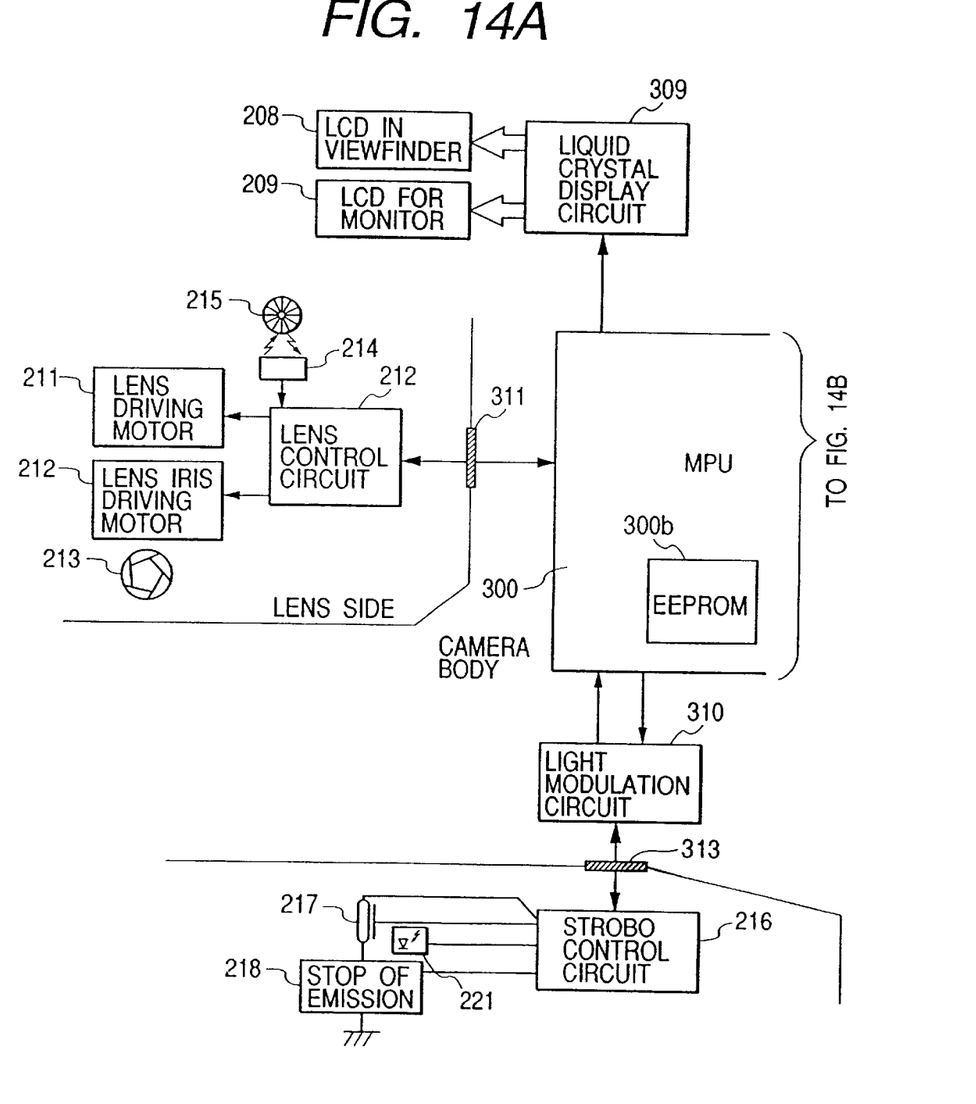
Figure 14B:
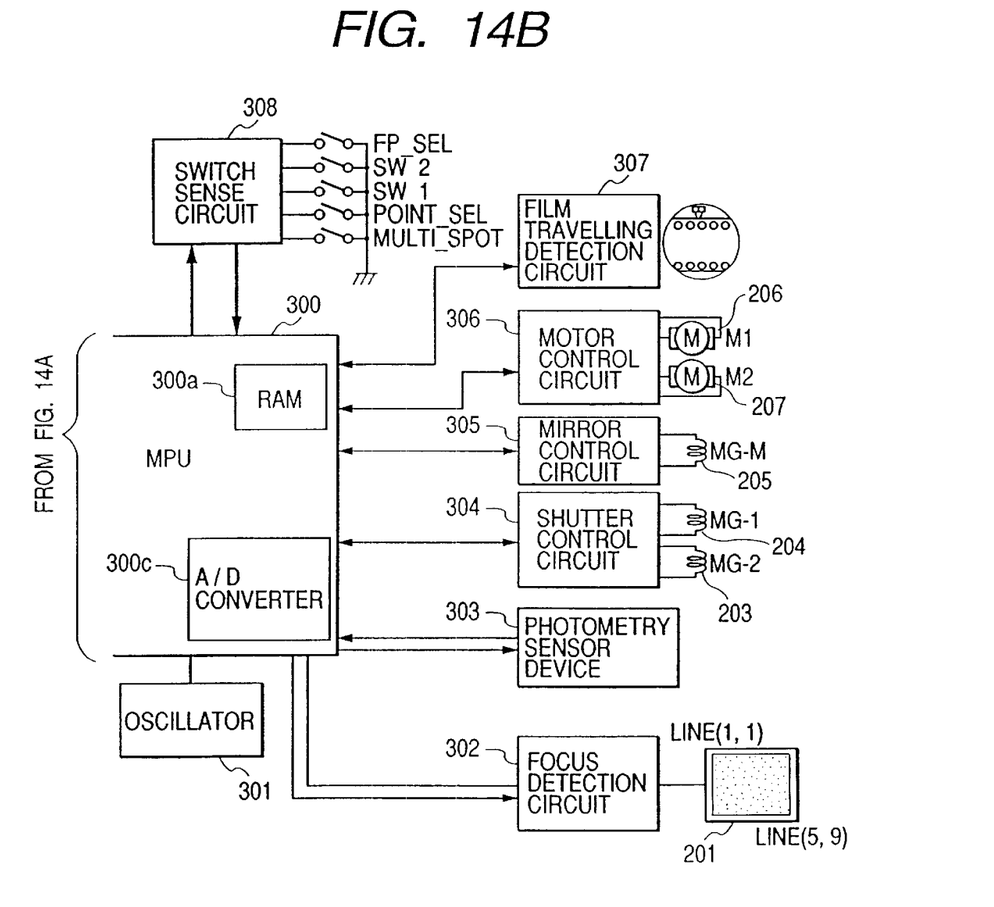

FIGS. 14A and 14B are views showing a camera system to which one of the light measuring devices of the above-described first to third embodiments is applied.

An MPU 300 is the central control unit of the camera and includes a RAM 300a, an EEPROM 300b as a nonvolatile memory, and an A/D converter 300c for converting an analog value such as a light measurement value or distance measurement data of the camera into a digital value.

An oscillator 301 generates an oscillation frequency for operating the MPU.

A focus detection circuit 302 is the central auto-focus unit having a sensor 201.

In the AF sensor of this embodiment, 45 pairs of distance measurement sensors are arrayed in a 5×9 matrix in the viewfinder field.

A light measuring device 303 comprises one of the devices described in the first to third embodiments.

Upon receiving a control signal from the MPU 300, a shutter control circuit 304 flows a current to a coil 204 MG-1 to run the shutter front curtain. After a predetermined time, the shutter control circuit 304 flows a current to a coil 203 MG-2 to run the shutter rear curtain.

A mirror control circuit 305 flows a current to a coil 205 MG-M in accordance with an instruction from the MPU 300 to move the mirror Up or down.

A motor control circuit 306 drives a motor 206 M1 and motor 207 M2 in accordance with an instruction from the MPU 300. The motor M1 is used for shutter charge, and the motor M2 winds up the film.

A film traveling detection circuit 307 irradiates the film which is being fed with infrared light and detects film traveling on the basis of the reflected light.

A switch sense circuit 308 manages the operation members or input switch of the camera. Examples of switches are a light measurement/distance measurement switch SW1, release switch SW2, and switch FP=hd —SEL for selecting the number of distance measurement points.

A liquid crystal display circuit 309 ON/OFF-controls an LCD 208 in viewfinder and an LCD 209 as an external liquid crystal display for monitor.

A light modulation circuit 310 controls strobe light emission or stop of emission.

A lens contact 311 has a terminal for supplying power supply voltages for lens driving and lens stop driving from the camera body and a terminal for a control signal from the camera body.

A lens control circuit 212 receives a control signal from the MPU 300 of the camera body and signals for controlling a lens driving motor 211 and lens iris/stop driving motor 212 or a signal from a photointerruptor 214 in the lens. The photointerruptor 214 outputs, to the lens control circuit 212, light transmitted through a pulse plate 215 that operates in synchronism with lens driving. A stop 213 is driven by the lens iris/stop driving motor.

A strobo control contact 313 has a communication terminal between the camera body and the electronic flash.

An external strobo control circuit 216 causes a xenon tube 217 to emit light or controls a stop-of-emission circuit 218 in accordance with the output from the light modulation circuit 310 of the camera body.

The light emission amount is controlled by detecting the output in the pre-emission mode with the light measuring device 303. A photodiode 221 monitors the output in the pre-emission mode by directly observing the output from the xenon tube, thereby controlling flat emission.

In this embodiment, output signals from the light measuring device in the normal light measurement mode are used for shutter speed control by the shutter control circuit 304 and stop control by the lens iris/stop driving motor 212. An output signal from the light measuring device in the integration light measurement mode is used for light emission amount control by the strobo control circuit 216.

A storage medium as the fourth embodiment will be described.

Figure 10:
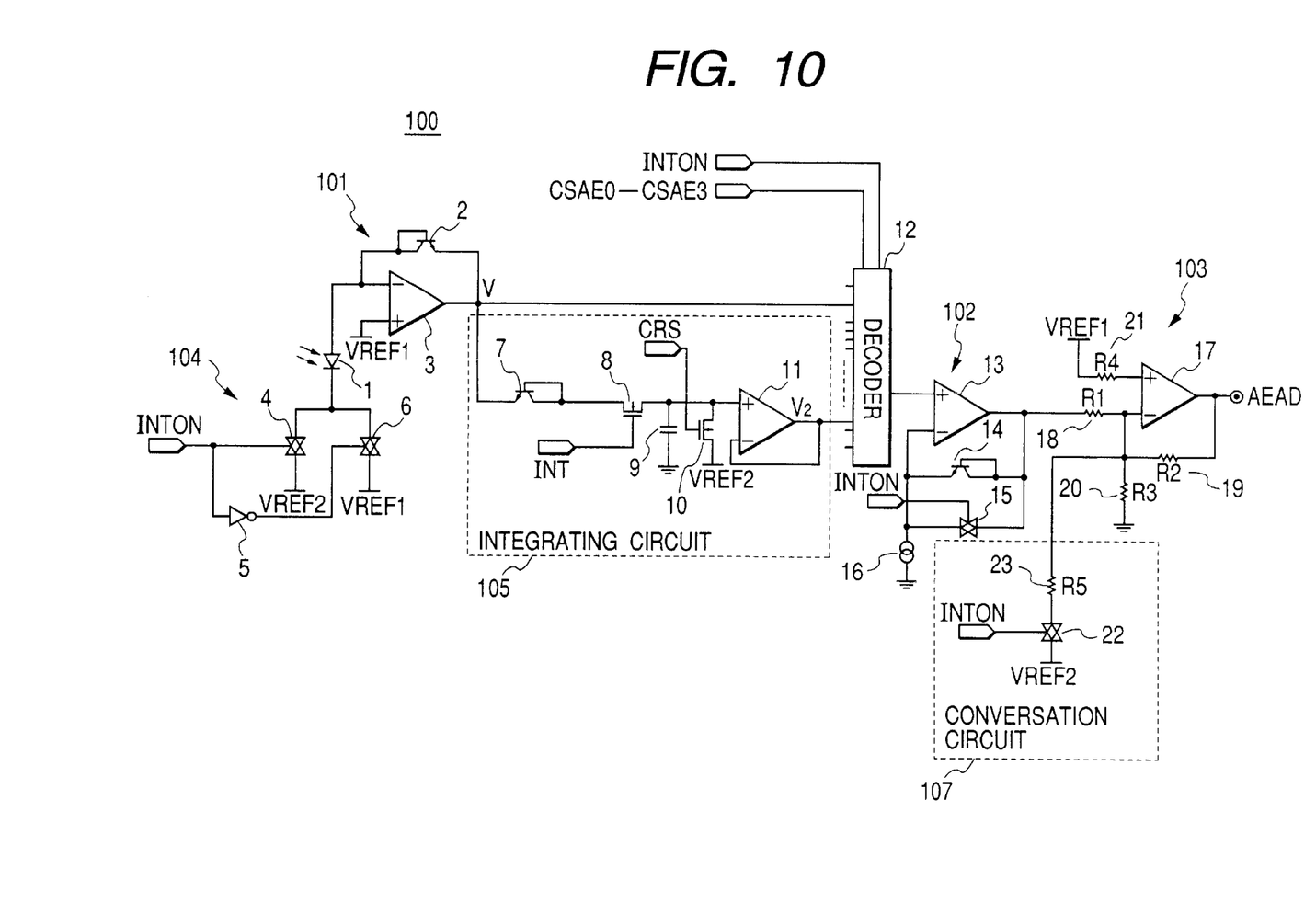
FIG. 10 is a view showing the second embodiment of the present invention.
Figure 11:
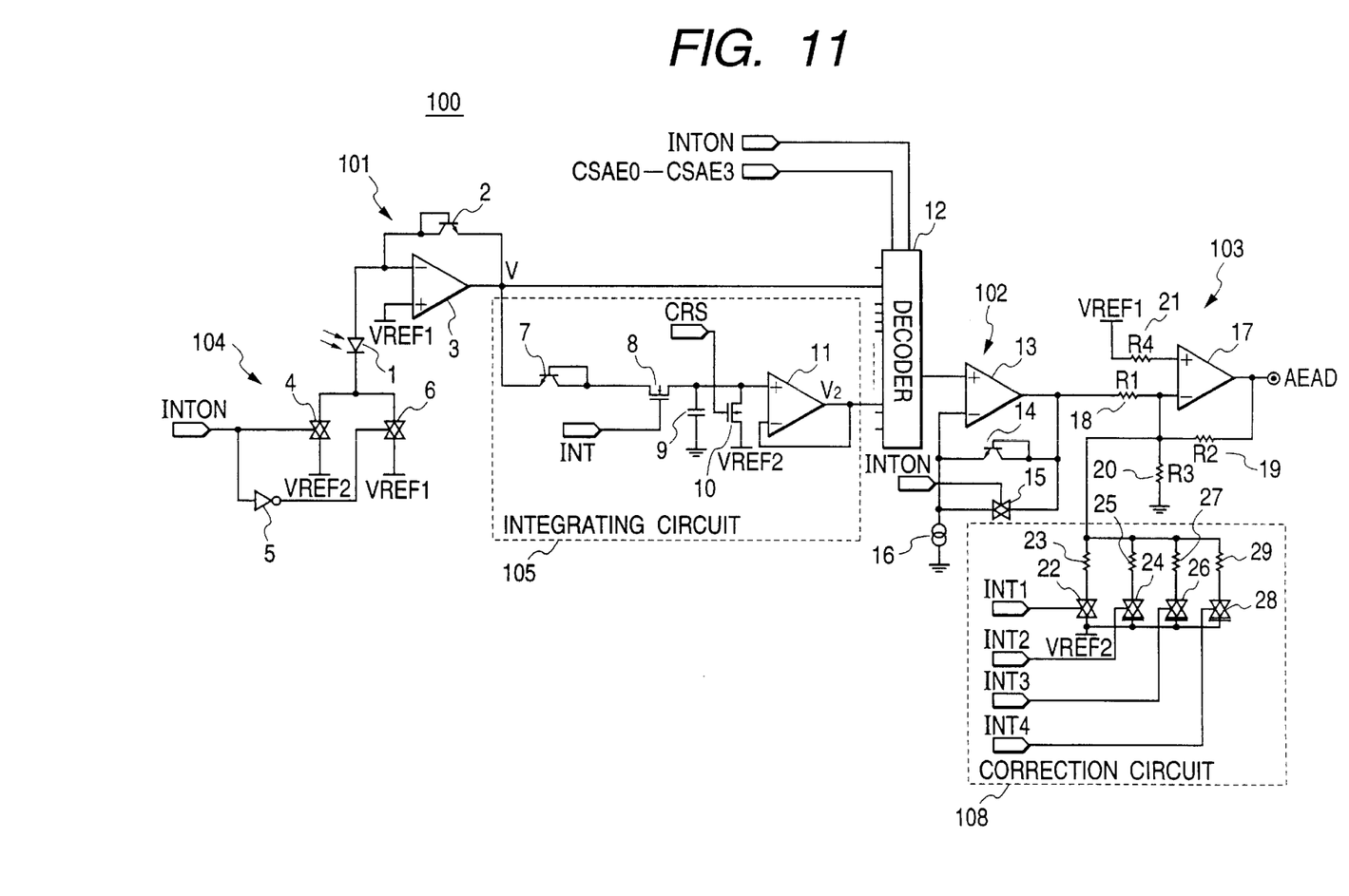
FIG. 11 is a view showing the third embodiment of the present invention.

The arrangement shown in FIG. 4, 10, or 11 may be constructed as either hardware or a computer system having a CPU, a memory, and the like. In the computer system, the memory constitutes the storage medium according to the present invention. This storage medium stores a program for executing the processing procedure for controlling the operation described above for each embodiment.

As the storage medium, a semiconductor memory such as a ROM, RAM, EEPROM, or flash memory, an optical disk, a magnetooptical disk, or a magnetic disk can be used. The memory can be used as a CD-ROM, a floppy disk, a magnetic disk, a magnetic card, or a nonvolatile memory card.

Even when the storage medium is used in a system or an apparatus other than the system shown in FIG. 4, 10, or 11, and the system or computer reads out the program codes stored in the storage medium and executes them, the same functions as in the above-described embodiments can be realized, and the same effects as in the above embodiments can be obtained. Hence, the objects of the present invention can be achieved.

When an operating system (OS) running on the computer performs part or all of processing, or when the program codes read out from the storage medium are written in the memory of a function expansion board inserted into the computer or a function expansion unit connected to the computer, and then the CPU of the function expansion board or function expansion unit performs part or all of processing on the basis of the instructions of the program codes, the same functions as in the above embodiments can be realized, and the same effects as in the embodiments can be obtained. Hence, the objects of the present invention can be achieved.

As has been described above, according to the first to fourth embodiments, since the sensor output is integrated, even when the number of divisions of the sensor is increased, the same light measurement time can be set by using the device for a limited light measurement time. With this arrangement, a system for performing pre-emission before photographing and calculating the light emission amount of actual light emission on the basis of the light measurement value and that immediately before pre-emission can be realized.

In addition, since the same light measurement output can be obtained with respect to the same luminance in both the integration light measurement mode and the normal light measurement mode, a common correction value can be used. Furthermore, since the same light measurement output can be obtained with respect to the same luminance even when the integration time is changed, a common correction value can be used, and calculation is facilitated.

Many widely different embodiments of the present invention may be constructed without departing from the spirit and scope of the present invention. It should be understood that the present invention is not limited to the specific embodiments described in the specification, except as defined in the appended claims.

What is claimed is:

1. A light receiving device comprising:
   a first photoelectric conversion unit;
   a second photoelectric conversion unit;
   a first read-out unit including a first integral circuit that integrates a signal read out from said first photoelectric conversion unit;
   a second read-out unit including a second integral circuit that integrates a signal read out from said second photoelectric conversion unit;
   a third read-out unit, provided in parallel with said first read-out unit, that reads out the signal from said first photoelectric conversion unit;
   a fourth read-out unit, provided in parallel with said second read-out unit, that reads out the signal from said second photoelectric conversion unit; and
   a selection circuit that selectively outputs signals from said first, second, third and fourth read-out units.

2. A light receiving device according to claim 1, further comprising a control circuit that controls the device so as to operate in a first mode that performs a light measurement operation with light emission of a light emission device, where the signal from said first photoelectric conversion unit is read out through said first read-out unit and the signal from said second photoelectric conversion unit is read out through said second read-out unit, and in a second mode that performs a light measurement operation without light emission of said light emission device, where the signal from said first photoelectric conversion unit is read out through said third second read-out unit and the signal from said second photoelectric conversion unit is read out through said fourth read-out unit.

3. A light receiving device according to claim 2, wherein said control circuit controls operation so that, in the first mode, said selection circuit selectively reads out signals stored in first and second integrating circuits, respectively, after light emission is completed.

4. A light receiving device according to claim 1, wherein each of said first and second integrating circuits includes a diode and a capacitor.

5. A light receiving device according to claim 1, further comprising a light emission device, and a control circuit that controls said light emission device.

6. A light receiving device according to claim 2, further comprising a control circuit that controls said light emission device.

7. A light receiving device according to claim 1, wherein each of said first and second photoelectric conversion units further comprises a change circuit that selectively supplies a plurality of bias voltage levels.

8. A light receiving device according to claim 2, further comprising a correction circuit that maintains the same light measurement output in the first and second modes.

9. A light receiving device according to claim 1, further comprising a change circuit that changes an integration time of said first and second integrating circuits.

10. A light receiving device according to claim 9, further comprising a correction circuit that maintains the same light measurement outputs independently of the integration time.

11. A light receiving device according to claim 1, wherein each said first and second integrating circuits comprises a buffer unit for the integrated signal.

12. A light receiving device according to claim 1, further comprising a plurality of sensor units, wherein each sensor unit has an integrating circuit.

* * * * *

UNITED STATES PATENT AND TRADEMARK OFFICE
CERTIFICATE OF CORRECTION

PATENT NO.      : 6,404,487 B1
DATED           : June 11, 2002
INVENTOR(S)     : Yoichi Sato et al.

It is certified that error appears in the above-identified patent and that said Letters Patent is hereby corrected as shown below:

Column 2,
Line 45, "sensors" should read -- sensor --.
Line 48, "settings" should read -- setting --.

Column 6,
Line 37, "Up" should read -- up --.
Line 48, "FP=hd_SEL" should read -- FP_SEL --.

Column 8,
Line 29, "second read-out unit" should read -- third read-out unit --.
Line 32, "third second read-out unit" should read -- second read-out unit --.
Line 37, "first" should read -- said first --.

Signed and Sealed this

Twenty-first Day of January, 2003

JAMES E. ROGAN
*Director of the United States Patent and Trademark Office*